United States Patent [19]

Benfarmeo et al.

[11] Patent Number: 5,182,041
[45] Date of Patent: Jan. 26, 1993

[54] DISPERSANT - ANTI-OXIDANT ADDITIVE AND LUBRICATING OIL COMPOSITION CONTAINING SAME

[75] Inventors: Nicholas Benfarmeo; Theodore E. Nalesnik, both of Wappingers Falls, N.Y.

[73] Assignee: Texaco Inc., White Plains, N.Y.

[21] Appl. No.: 620,688

[22] Filed: Dec. 3, 1990

Related U.S. Application Data

[63] Continuation of Ser. No. 345,265, May 1, 1989, abandoned.

[51] Int. Cl.⁵ ............... C10M 133/38; C10M 149/00
[52] U.S. Cl. ............................. 252/51.5 A; 252/47.5
[58] Field of Search ................................ 252/51.5 A

[56] References Cited

U.S. PATENT DOCUMENTS 3,272,746  9/1966  LeSuer et al. .............. 252/51.5 A
4,234,435  11/1980  Meinhardt et al. ............ 252/46.7
4,863,623  9/1989  Nalesnik ..................... 252/50

Primary Examiner—Ellen McAvoy
Attorney, Agent, or Firm—Robert A. Kulason; Robert B. Burns; James J. O'Loughlin

[57] ABSTRACT

An additive composition comprising a graft and amine-derivatized polymer having an average molecular weight ranging from about 300 to 3500 which has been reacted with at least one olefinic carboxylic acid acylating agent to form one or more acylating reaction intermediates characterized by having a carboxylic acid acylating function within their structure and reacting said reaction intermediate with an amino-aromatic polyamine compound from the group consisting of an N-arylphenylenediamine, an aminothiazole, an aminocarbazole, an amino-indazolinone, an aminomercaptotriazole and an aminoperimidine to form said graft and amine-derivatized copolymer, and a lubricating oil composition containing same are provided.

22 Claims, No Drawings

DISPERSANT - ANTI-OXIDANT ADDITIVE AND LUBRICATING OIL COMPOSITION CONTAINING SAME

This is a continuation of application Ser. No. 07/345,265, filed May 1, 1989, now abandoned.

BACKGROUND OF THE INVENTION

This invention relates to a lubricant additive which is effective as a dispersant and an anti-oxidant additive when employed in a lubricating oil composition.

DISCLOSURE STATEMENT

The art contains many disclosures on the use of polymeric additives in lubricating oil compositions. Ethylene-propylene copolymers and ethylene-alpha olefin non-conjugated diene terpolymers some of which have been further derivatized to provide bifunctional properties in lubricating oil compositions illustrate this type of oil additive.

U.S Pat. No. 3,522,180 discloses a method for the preparation of an ethylene-propylene copolymer substrate effective as a viscosity index improver for lubricating oils.

U.S. Pat. No. 4,026,809 discloses graph copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graph copolymer where the backbone polymer is an oil-soluble ethylene-propylene copolymer or an ethylene-propylene-diene modified terpolymer with a graph monomer of C-vinylpyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$-$C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant - VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with a alkaryl sulfonic acid.

U.S. Pat. Nos. 3,172,892 and 4,048,080 disclose alkenylsuccinimides formed from the reaction of an alkenyl-succinic anhydride and an alkylene polyamine and their use as dispersants in a lubricating oil composition.

The disclosures in the forgoing patents which relate to VI improvers and dispersants for lubricating oils, namely U.S. Pat. Nos. 3,172,892, 3,522,180, 4,026,809, 4,048,080, 4,089,794, 4,137,185 4,144,181, 4,146,489, 4,320,019, 4,340,689, 4,357,250, and 4,382,007 are incorporated herein by reference.

An object of this invention is to provide a novel graft and derivatized polymeric composition.

Another object of the invention is to provide a lubricant additive effective for imparting dispersancy and anti-oxidant properties to a lubricating oil composition.

A further object is to provide a novel lubricating oil composition containing the graft and derivatized polymer additive of the invention as well as to provide concentrates of the novel additive of invention.

SUMMARY OF THE INVENTION

The novel reaction product of the invention comprises a polyolefin having a molecular weight ranging from about 300 to about 3500 which has been acylated with an ethylenically unsaturated carboxylic function and further derivatized with an amino-aromatic polyamine compound. The polyolefin may be a homopolymer, or a copolymer or terpolymer of a $C_2$ to $C_{10}$ alpha-monoolefin and optionally a non-conjugated diene or triene acylated with a carboxylic function and then derivatized with an amino-aromatic polyamine compound from the group consisting of:

a) an N-arylphenylenediamine represented by the formula:

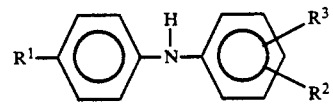

in which $R^1$ is H, -NHaryl, -NHarylalkyl, a branched or straight chain radical having from 4 to 24 carbon atoms that can be alkyl, alkenyl, alkoxyl, aralkyl alkaryl, hydroxyalkyl or aminoalkyl, $R^2$ is $NH_2$, —$(NH(CH_2)_n$—)-$_m$—$NH_2$ $CH_2$—$(CH_2)_n$—$NH_2$, $CH_2$—aryl—$NH_2$ in which n and m has value from 1 to 10 $R^3$ is alkyl, alkenyl, alkoxyl, aralkyl, alkaryl, having from 4 to 24 carbon atoms, b) an aminothiazole from the group consisting of aminothiazole, aminobenzothiazole, aminobenzothiadiazole and aminoalkylthiazole, c) an aminocarbazole represented by the formula:

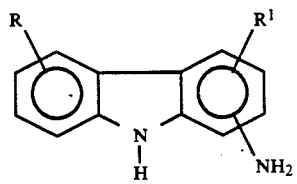

in which R and $R^1$ represent hydrogen or an alkyl or alkenyl, radical having from 1 to 14 carbon atoms, d) an amino-indazolinone represented by the formula:

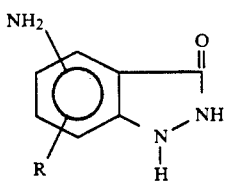

in which R is hydrogen or an alkyl radical having from 1 to 14 carbon atoms e) an aminomercaptotriazole represented by the formula:

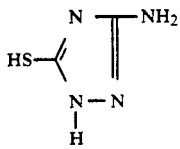

f) and an aminoperimidine represented by the formula,

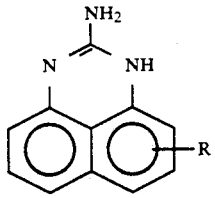

in which R represents hydrogen or an alkyl radical having from 1 to 14 carbon atoms.

The novel lubricant of the invention comprises an oil of lubricating viscosity and an effective dispersant amount of the novel reaction product. The lubricating oil will also be characterized by having anti-oxidant properties.

Concentrates of the reaction product of the invention are also contemplated.

DETAILED DESCRIPTION OF THE INVENTION

The homopolymer or copolymer substrate employed in the novel additive of the invention may be prepared from ethylene, propylene, butylene, isobutylene or generally from an olefin having from two to ten carbon atoms.

More complex polymer substrates, designated as interpolymers, may also be prepared. In this case, another polyene component is used to prepare an interpolymer substrate. Particularly suitable polyene monomers are selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3,4,7,7-tetrahydroindene, 1-isopropylidenedicyclopentadiene, dehydro-isodicyclopentadiene, and 2-(2-methylene-4-methyl-3-pentenyl)-[2.2.1] bicyclo-5-heptene.

A preferred homopolymer is polybutylene or still more preferred polyisobutylene having a molecular weight from about 300 to 3500. Polymers having molecular weights from about 1000 to 2500 are more preferred with polymers having molecular weights from about 1200 to 2000 being most preferred. In general, these polymers have outstanding solubility in a lubricating oil base. The prescribed polymers or copolymers do not provide effective viscosity index improving properties to a lubricating oil because of their relatively low molecular weight.

The polymerization reaction to form the polymer substrate may be carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5-8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40-45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Homopolymers may be produced from ethylene, propylene, butylene, isobutylene and higher olefins.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 80 mole percent ethylene and from about 20 to 75 mole percent of a $C_3$ to $C_{10}$ alpha monoolefin.

Terpolymer variations of the foregoing polymers may contain from about 0.1 to 10 mole percent of a non-conjugated diene or triene.

The polymer substrate is essentially an oil-soluble, substantially linear, viscous liquid having an average molecular weight from about 300 to 3500 with a preferred molecular weight range of 1,000 to 2,500.

The term polymer is used generically to encompass homopolymers, copolymers and terpolymers or interpolymers. These materials may contain minor amounts of other olefinic monomers so long as their basic characteristics are not materially changed.

An ethylenically unsaturated carboxylic acid material is next reacted with the prescribed polymer backbone to produce an acylated reaction product. These materials which are attached to the polymer contain at least one, preferably two, chemically bonded carboxylic acid or acid anhydride group or a polar group which is convertible into said carboxyl groups by oxidation or hydrolysis. Maleic anhydride or a derivative thereof is preferred. It reacts with the homopolymer, copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The ethylenically unsaturated carboxylic acid material may be attached to the polymer backbone in a number of ways. It may be grafted onto the backbone by a thermal process known as the "ene" process or by grafting in solution or in solid form using a radical initiator. This is the preferred method for polybutene backbones. The free-radical induced grafting of ethylenically unsaturated carboxylic acid materials in solvents, such as benzene is the preferred method for ethylene propylene type poymers. It is carried out at an elevated temperature in the range of about 100° C. to 250° C., preferably 120° to 190° C. and more preferably at 150° to 180° C., e.g. above 160° C., neat, or in a solvent. The solvent, preferably a mineral lubricating oil solution containing, e.g. 1 to 50, preferably 5 to 30 wt. %, based on the initial total oil solution, of the ethylene polymer and preferably under an inert environment.

The free-radical initiators which may be used are peroxides, hydroperoxides and azo compounds and preferably those which have a boiling point greater than about 100° C. and decompose thermally within the grafting temperature range to provide free radicals. Representative of these free-radical initiators are azobutyronitrile, -2,5-dimethylhex-3-yne-2,5 bis-tertiary-butyl peroxide and dicumene peroxide. The initiator, when used, is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted on molten rubber using rubber masticating or shearing equipment. The temperature of the molten material in this process may range from about 150°–4000° C.

Polymer substrates or interpolymers are available commercially. Particularly useful are the polybutylenes, and more particularly polyisobutylene. Also useful are the copolymers containing from about 40 to about 80 mole percent ethylene units and about 60 to about 20 mole percent propylene units.

The polymer intermediate possessing carboxylic acid acylating functions is reacted with an amino-aromatic polyamine compound from the group consisting of:

a) an N-arylphenylenediamine represented by the formula:

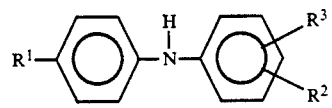

in which $R^1$ is hydrogen, -NH-Aryl, -NH-Arylkyl, a branched or straight chain radical having from 4 to 24 carbon atoms that can be alkyl, alkenyl, alkoxyl aralkyl alkaryl, hydroxyalkyl or aminoalkyl $R^2$ is $NH_2$, $-(NH(CH_2)_n-)_m-NH_2CH_2-(CH_2)_n-NH_2$, $CH_2$-aryl-$NH_2$, in which n and m has a value from 1 to 10, and $R^3$ is alkyl, alkenyl, alkoxyl, aralkyl, alkaryl having from 4 to 24 carbon atoms b) an aminothiazole from the group consisting of aminothiazole, aminobenzothiazole, amionbenzothiadiazole and aminoalkylthiazole c) an aminocarbazole represented by the formula:

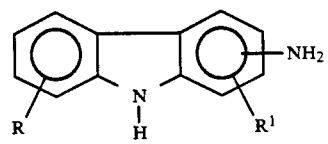

in which R and $R^1$ represent hydrogen or an alkyl, alkenyl, or alkoxyl radical having from 1 to 14 carbon atoms d) an amino-indazolinone represented by the formula:

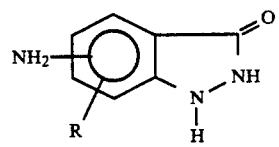

in which R is hydrogen or an alkyl radical having from 1 to 14 carbon atoms e) an aminomercaptotriazole represented by the formula:

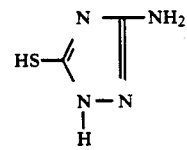

f) an aminoperimidine represented by the formula:

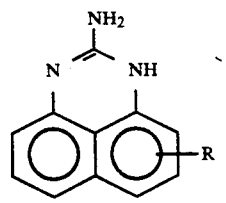

in which R represents hydrogen or an alkyl or alkoxyl radical having from 1 to 14 carbon atoms.

Particularly preferred N-arylphenylenediames are the N-phenylphenylenediamines, N-Naphthylphenylenediamines and N-phenylnaphthylenediamines for example, N-phenyl-1,4-phenylenediamine, N-phenyl-1,3-phenylenediamine, and N-phenyl-1,2-phenylenediamine.

The reaction between the polymer substrate intermediate having attached thereto a carboxylic acid acylating function and the prescribed amino-aromatic polyamine compound is conducted by heating a solution of the polymer substrate under inert conditions and then adding the amino-aromatic polyamine compound to the heated solution generally with mixing to effect the reaction. It is convenient to employ an oil solution of the polymer substrate heated to 140° to 175° C. while maintaining the solution under a nitrogen blanket. The amino-aromatic polyamine compound is added to this solution and the reaction is effected under the noted conditions. This reaction may be conducted in the presence of other additives in the oil solution.

The following examples illustrate the preparation of the novel reaction product additive of the invention.

EXAMPLE I 200 grams (0.081 moles) of a polybuteneyl succinic anhydride prepared from a polybutene of about 1290 molecular weight (Indopol H-300) and maleic anhydride was added to 50 grams of a pale mineral oil having a viscosity of about 100 at 100° C. This mixture was heated to about 60° C. under a nitrogen atmosphere. 15 grams (0.081 moles) of N-phenyl-p-phenylenediamine was added to the reaction mixture which was then heated to 120° C. The reaction was continued under these conditions for 3 hours. The reaction product was then cooled to about 80° C. and filtered through an inert filtering mineral (Celite). The following table gives typical analyses for this product.

| | |
|---|---|
| % N | 0.87 |
| Specific Gravity 60/60° F. | 0.9189 |
| Flash, COC, °F. | 440 |
| Kinematic Viscosity, cSt 100° C. | 143 |

EXAMPLE II 200 grams (0.34 moles) of a polybuteneyl succinic anhydride prepared from a polybutene of about 320 molecular weight (Amoco L-14) and maleic anhydride was added to grams of a pale mineral oil having a viscosity of about 100 at 100° C. This mixture was heated to about 60° C. under a nitrogen atmosphere. 62 grams (0.34 moles) of N-phenyl-p-phenylenediamine was added to the reaction mixtures which was then heated to 120° C. The reaction was continued under these conditions for about 3 hours and then cooled to about 80° C. and filtered as described in Example I. The following table gives typical analyses for this product.

| | |
|---|---|
| % N | 1.44 |
| Specific Gravity 60/60° F. | 0.9587 |
| Flash, COC, °F. | 450 |
| Kinematic Viscosity, cSt 100° C. | 97.6 |

EXAMPLE III TO VIII

Derivatized graft polymers are prepared employing the polymer and procedures shown in Example I employing the following amino-aromatic polyamines

| | |
|---|---|
| Example III | Aminothiazole |
| Example IV | Aminocarbazole |
| Example V | Aminoperimidine |
| Example VI | Aminomercaptotriazole |
| Example VII | N-phenyl-1,3-phenylenediamine |

The novel graft and derivatized polymer of the invention are useful as additives in lubricating oils. They are multi-functional additives being effective to provide dispersancy and anti-oxidant properties to lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

The lubricating oil composition of the invention may contain the novel reaction product in a concentration ranging broadly from about 0.05 to 20 weight percent. A preferred concentration range for the additive is from about 1 to 9 weight percent based on the total weight of the oil composition.

Oil concentrates of the additives may contain from about 20 to 90 weight percent of the additive reaction product in a carrier or diluent oil of lubricating oil viscosity.

The novel reaction product of the. invention may be employed in lubricant compositions together with conventional lubricant additives. Such additives may include additional dispersants, detergents, anti-oxidants, pour point depressants, anti-wear agents and the like.

The novel additive reaction product of the invention was tested for its effectiveness as a dispersant and as an anti-oxidant in a lubricating oil composition.

The anti-oxidant properties of the reaction product of the invention was determined in the Bench Oxidation Test. In this test, a weighted sample of the reaction product additive is blended into solvent neutral oil (SNO) having an S.U.S. viscosity at 100° F. of 130. The oil composition is heated to 175° C. under a nitrogen blanket. A sample is taken to establish a base line. The oil is maintained at 175° C. while a stream of air is passed through it at the rate of 500 ml/minute for six hours. Samples are taken every hour and the DIR of each sample is determined against the base line at 1712 CM-1. The six-hour DIR is used as a measure of oxidation; the smaller the value, the better the antioxidant properties. A six-hour DIR of 1.0 indicates that little or no oxidation has taken place.

TABLE I

BENCH OXIDATION TEST

| RUN | TEST MIXTURE (1) | ADDITIVE CONCENTRATION WT. % (2) | % N IN OIL | 6 HR. DIR |
|---|---|---|---|---|
| 1 | Solvent Neutral Oil | NA | NA | 20.17 |
| 5 | Example II | 1.0 | 0.0157 | 11.42 |
| 6 | Example II | 2.0 | 0.0314 | 1.37 |
| 7 | Example II | 3.0 | 0.0471 | 1.40 |

TABLE I-continued

| | | BENCH OXIDATION TEST | | |
|---|---|---|---|---|
| RUN | TEST MIXTURE (1) | ADDITIVE CONCENTRA- TION WT. % (2) | % N IN OIL | 6 HR. DIR |
| 2 | Example I | 1.0 | 0.0087 | 20.00 |
| 3 | Example I | 2.0 | 0.0174 | 4.29 |
| 4 | Example I | 3.0 | 0.0261 | 1.14 |

(1) Blends contained 0.18% calcium.
(2) Additive used as 50% concentrate in oil.

This example demonstrates the substantial improvement in the anit-oxidant properties of oil composition containing the reaction product of the invention.

The dispersancy of the additives was evaluated in the Bench Sludge Test (BST) which measures the ability of a dispersant to solublize particles in the oil. This test is conducted by heating the test oil mixed with a synthetic hydrocarbon blowby and diluent oil at a fixed temperature for a fixed time period. After heating, the turbidity of the resulting mixture is measured. A low percentage turbidity (0-10) is indicative of good dispersancy while an intermediate value (20-40) indicates intermediate dispersancy and a high value (20-100), increasingly poor dispersancy. The additives were tested at a 5 wt. % treating dosage in an SAE 10W-30 formulation and compared to good, fair and poor references (Table II).

TABLE II

| | BENCH SLUDGE TEST | | | |
|---|---|---|---|---|
| MATERIAL | BST RATING | OIL REFERENCES | | |
| | | GOOD | FAIR | POOR |
| Example I | 22.0 | 17.4 | 30.2 | 48.0 |
| Example II | 63.0 | 13.0 | 26.0 | 40.0 |

The lubricating oil containing the additive of Example I exhibited a very effective level of dispersancy in comparison to the standard reference oils.

The fully formulated lubricating oil composition was tested in the MWM-B single cylinder diesel engine test both with an without the additive of the invention. Motor Oil A designates the diesel engine oil and Motor Oil B designates the sam oil containing 2 weight percent of the additive of Example I. The ratings are based on a value of 100 assigned to a new unused piston. The results are given in the table below.

TABLE III

| EFFECT OF THE ANTIOXIDANT ON ENGINE OIL PERFORMANCE | |
|---|---|
| Oil | Piston Cleanliness Rating (1) |
| Motor Oil A | 58 merits |
| Motor Oil B | 66 merits |

(1) The higher the value the cleaner the piston.

This test demonstrates that the additive containing oil of the invention provided a substantially cleaner piston in the diesel engine test.

What is claimed is:

1. An additive composition prepared by the steps comprising:
   A) reacting a homopolymer or a copolymer prepared from an alpha-monoolefin having from 2 to 10 carbon atoms and optionally a polyene selected from non-conjugated dienes and trienes said homopolymer or copolymer having an average molecular weight ranging from about 300 to 3500 with at least one olefinic carboxylic acid acylating agent to form one or more acylating reaction intermediates characterized by having a carboxylic acid acylating function within their structure, and
   B) reacting said reaction intermediate in (A) with an amino-aromatic polyamine compound selected from the group consisting of:
   a) an N-arylphenylenediamine represented by the formula:

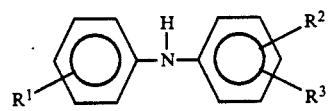

in which $R^1$ is hydrogen, $R^2$ is $NH_2$, $—(N-H—(CH_2)_n—)_m—NH_2$ and $R^3$ is alkyl, alkenyl, alkoxyl, aralkyl, alkaryl having 4 to 24 carbon atoms, b) an aminothiazole from the group consisting of aminothiazole, aminobenzothiazole, aminobenzothiadiazole and aminoalkylthiazole, c) an aminocarbazole represented by the formula:

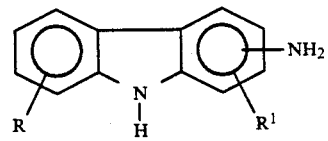

in which R and $R^1$ represent hydrogen or an alkyl or alkenyl, radical having from 1 to 14 carbon atoms, d) an amino-indazolinone represented by the formula:

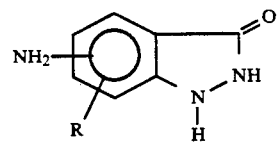

in which R is hydrogen or an alkyl radical having from 1 to 14 carbon atoms e) an aminomercaptotriazole represented by the formula:

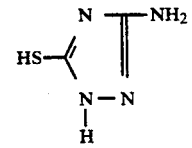

f) and an aminoperimidine represented by the formula:

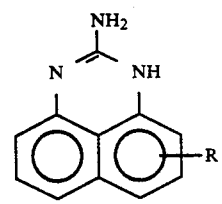

in which R represents hydrogen or an alkyl, alkenyl, or alkoxyl radical having from 1 to 8 carbon atoms.

2. A composition according to claim 1 in which said homopolymer or copolymer has an average molecular weight from about 1000 to 2500.

3. A composition according to claim 1 in which said homopolymer or copolymer has an average molecular weight from about 1,200 to 2,000.

4. A composition according to claim 1 in which said homopolymer is polybutene.

5. A composition according to claim 1 in which said polymer comprises from about 15 to 80 mole percent ethylene and from about 20 to 85 mole percent of a $C_3$ to $C_8$ alpha-monoolefin.

6. A composition according to claim 1 in which said polymer comprises from about 25 to 80 mole percent ethylene and from about 20 to 75 mole percent of propylene.

7. A composition according to claim 1 in which said olefinic carboxylic acid acylating agent is maleic anhydride.

8. A composition according to claim 1 in which said homopolymer is poly isobutylene having a molecular weight from about 1000 to 2500.

9. A composition according to claim 1 in which said amino-aromatic polyamine compound is an N-aryl or N-alkyl substituted phenylenediamine.

10. A composition according to claim 9 in which said amino-aromatic polyamine compound is an N-phenylphenylenediamine.

11. A composition according to claim 9 in which said amino-aromatic polyamine compound is aminothiazole.

12. A lubricating oil composition comprising a major amount of an oil of lubricating viscosity and a minor amount effective to impart dispersancy and antioxidant properties to said oil of an additive composition prepared by the steps comprising:
A) reacting a homopolymer or a copolymer prepared from an alpha-monoolefin having from 2 to 10 carbon atoms and, optionally, a polyene selected from non-conjugated dienes and trienes having an average molecular weight ranging from about 300 to 3500 with at least one olefinic carboxylic acid acylating agent to form one or more acylating reaction intermediates characterized by having a carboxylic acid acylating function within their structure, and
B) reacting said reaction intermediate in (A) with an amino-aromatic polyamine compound selected from the group consisting of:
(1) an N-arylphenylenediamine represented by the formula:

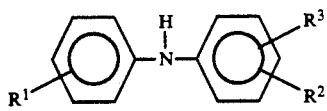

in which $R^1$ is hydrogen, $R^2$ is —$NH_2$, and $R_3$ is alkyl, aralkyl, and alkaryl of from 4 to 24 carbon atoms;
(2) an aminothiazole from the group consisting of aminothiazole, aminobenzothiazole, aminobenzothiadiazole, and aminoalkylthiazole;
(3) an aminocarbazole represented by the formula:

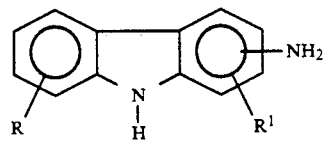

in which R and $R^1$ represent hydrogen or an alkyl or alkoxyl radical having from 1 to 14 carbon atoms;
(4) an amino-indazolinone represented by the formula:

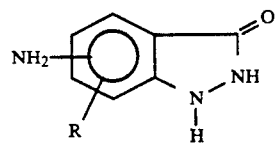

in which R is hydrogen or an alkyl radical having from 1 to 14 carbon atoms;
(5) an aminomercaptotriazole represented by the formula:

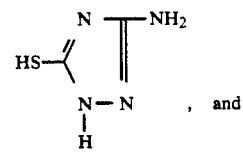

(6) an aminoperimidine represented by the formula:

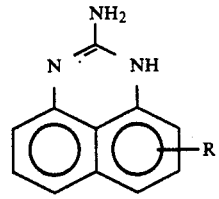

in which R represents hydrogen or an alkyl, alkenyl or alkoxyl radical having from 1 to 14 carbon atoms.

13. A lubricating oil composition according to claim 12 containing from about 0.05 to 20 weight percent of said additive based on the total weight of the oil composition.

14. A lubricating oil composition according to claim 12 containing from about 1 to 9.5 weight percent of said additive based on the total weight of the oil composition.

15. A lubricating oil composition according to claim 12 in which said polymer comprises from about 15 to 80 mole percent ethylene and from about 20 to 85 mole percent of a $C_3$ to $C_8$ alpha-monoolefin.

16. An additive composition according to claim 1 in which said N-arylphenylenediamine is N-phenyl-1,4-phenylenediamine.

17. An additive composition according to claim 1 in which said N-arylphenylenediamine is N-phenyl-1,3-phenylenediamine.

18. A lubricating oil composition according to claim 12 in which said N-arylphenylenediamine is N-phenyl-1,4-phenylenediamine.

19. A lubricating oil composition according to claim 12 in which said N-phenylphenylenediamine is N-phenyl-1,3-phenylenediamine.

20. A concentrate for a lubricating oil comprising a diluent oil of lubricant viscosity and from about 1 to 70 weight percent of the additive composition of claim 1 based on the total weight of the concentrate.

21. A lubricating oil composition according to claim 12 in which said homopolymer is polybutene.

22. A lubricating oil composition according to claim 12 in which said homopolymer is polyisobutylene having a molecular weight ranging from about 1000 to 2500.

* * * * *